US012737484B2

(12) United States Patent
Romansky et al.

(10) Patent No.: US 12,737,484 B2
(45) Date of Patent: Sep. 15, 2026

(54) QUANTUM COMPUTING RESISTANT VEHICLE TO EVERYTHING COMMUNICATION

(71) Applicant: INTEGRITY Security Services LLC, Ashburn, VA (US)

(72) Inventors: Brian Romansky, Monroe, CT (US); Jimmy R. Upton, Santa Barbara, CA (US)

(73) Assignee: INTEGRITY SECURITY SERVICES LLC, Ashburn, VA (US)

( * ) Notice: Subject to any disclaimer, the term of this patent is extended or adjusted under 35 U.S.C. 154(b) by 0 days.

(21) Appl. No.: 19/359,102

(22) Filed: Oct. 15, 2025

(65) Prior Publication Data

US 2026/0105167 A1 Apr. 16, 2026

Related U.S. Application Data

(60) Provisional application No. 63/707,347, filed on Oct. 15, 2024.

(51) Int. Cl.
*G06F 21/60* (2013.01)

(52) U.S. Cl.
CPC .................................. *G06F 21/606* (2013.01)

(58) Field of Classification Search
CPC ..................................................... G06F 21/606
See application file for complete search history.

(56) References Cited

U.S. PATENT DOCUMENTS 10,250,383 B1 * 4/2019 Kumar ................ H04W 12/108
2014/0270172 A1 9/2014 Peirce (Continued)

OTHER PUBLICATIONS

Gong, Yujing, and Bin-Jie Hu. "A quantum-resistant key management scheme using blockchain in C-V2X." IEEE Transactions on Intelligent Transportation Systems (2024). Date of publication Jul. 23, 2024 (Year: 2024).*

Camenisch, Jan, et al. "Zone encryption with anonymous authentication for V2V communication." 2020 IEEE European Symposium on Security and Privacy (EuroS&P). IEEE, 2020. (Year: 2020).*

Yoshizawa, Takahito, et al. "A survey of security and privacy issues in v2x communication systems." ACM Computing Surveys 55.9 (2023): 1-36. (Year: 2023).*

(Continued)

*Primary Examiner* — James R Turchen

(74) *Attorney, Agent, or Firm* — MH2 Technology Law Group, LLP

(57) ABSTRACT

A system for securing a message between a vehicle station and second station includes: a vehicle station configured to be located in a vehicle; a second station configured to be located at a second station location other than the vehicle. The vehicle station is configured to receive a message from the second station, the second station transmits the message and a signature to the vehicle station over a first channel, the second station transmits identity validation data related to the message to the vehicle station over a second channel, the identity validation data corresponds to the vehicle station, the first channel is on a first network and the second channel is on a second network, the first network has a latency lower than the latency of the second network, the message requires the identity validation data for a portion of the message to be processed by the vehicle station, the second network has a higher bandwidth than the first network, and the identity validation data includes a time interval for use of the identity validation data, the identity validation data and the signature being configured to be used by the vehicle station and the second station to determine a validity of the message for use by the vehicle station.

30 Claims, 2 Drawing Sheets

(56) References Cited

U.S. PATENT DOCUMENTS

| | | | | |
|---|---|---|---|---|
| 2019/0200228 | A1 | 6/2019 | Adrangi et al. | |
| 2019/0223008 | A1* | 7/2019 | Vanderveen | H04W 12/041 |
| 2020/0228988 | A1 | 7/2020 | Yang et al. | |
| 2021/0314748 | A1* | 10/2021 | Cominetti | H04W 12/069 |
| 2022/0030430 | A1 | 1/2022 | Lund et al. | |
| 2023/0269102 | A1 | 8/2023 | Ryu et al. | |
| 2024/0056816 | A1 | 2/2024 | Kolekar et al. | |
| 2024/0144741 | A1 | 5/2024 | Han | |
| 2024/0146610 | A1* | 5/2024 | Griffin | H04L 41/0869 |
| 2024/0154822 | A1 | 5/2024 | Barrett et al. | |
| 2024/0305443 | A1* | 9/2024 | Edge | H04L 9/0833 |
| 2024/0323651 | A1 | 9/2024 | Vanderveen et al. | |
| 2025/0203356 | A1* | 6/2025 | Elshafie | H04L 9/3247 |

OTHER PUBLICATIONS

Flimm et al.; What are the differences between a digital signature, a MAC and a hash? Asked 12 years, 11 months ago from date of retrieval Dec. 4, 2025; retrieved from https://crypto.stackexchange.com/questions/5646/what-are-the-differences-between-a-digital-signature-a-mac-and-a-hash (Year: 2013).*

International Search Report and Written Opinion dated Feb. 17, 2026, PCT Application No. PCT/US2025/056611, 14 pages.

International Search Report and Written Opinion dated Dec. 30, 2025, PCT Application No. PCT/US2025/051084, 16 pages.

Romansky, "Quantum-Computing-Resistant, Vehicle-to-Everything Communication on Apeer-to-Peer Network", U.S. Appl. No. 19/397,180, filed Nov. 21, 2025.

* cited by examiner

QUANTUM COMPUTING RESISTANT VEHICLE TO EVERYTHING COMMUNICATION

CROSS-REFERENCE TO RELATED APPLICATIONS

This application claims the benefit of U.S. Provisional Application No. 63/707,347 filed on 15 Oct. 2024, which is hereby incorporated by reference in its entirety.

FIELD OF THE INVENTION

This invention relates to the systems, devices, computer applications, and methods for secure communications with, for example, vehicles.

BACKGROUND

The development of effective quantum computing technology may threaten the integrity of most existing public key algorithms currently in use. This includes the elliptic curve algorithm which is critical to many vehicle-to-everything (V2X) architectures. While alternative approved algorithms exist that are believed to be resistant to attacks that use a quantum computer, these algorithms have dramatically larger signatures and public keys than the existing solution. This means that the transition to a post-quantum algorithm may require design changes beyond simply replacing the signature algorithm with an approved variant.

Accordingly, it is desirable to provide improved systems, methods, products, and techniques for secure communications with vehicles. Various embodiments described herein address the above-noted and other drawbacks associated with conventional systems and techniques for securing communications with vehicles against attacks using quantum computing.

SUMMARY

Embodiments of the disclosure include hybrid systems that take advantage of multiple messaging channels along with specific algorithm recommendations to provide viable and effective options for post-quantum V2X communications. The concepts described herein may be implemented or embodied in the form of devices (e.g., computing systems), processes (e.g., computer-implemented methods), and manufactures (e.g., computer readable media containing program instructions).

In addition to sharing a common digital signature algorithm, many V2X architectures rely on direct peer-to-peer messaging over a dedicated channel. This channel can use the cellular vehicle-to-everything (C-V2X) "PC5" interface. Limitations in the bandwidth on the PC5 channel impose significant limits on the size of digital signature and source validation certificates that can be used. Communication of additional information, such as larger certificates or channel coordination messages can require additional bandwidth.

An alternate channel that is available to many V2X devices in the "Uu" or carrier-based interface. The Uu interface is the air interface that connects a mobile device to the cellular radio access network. This communication method can require mediation through a cellular tower and access to cloud applications. This method allows for much higher data capacity, but with increased latency and some limitations on coverage due to the need for cellular tower access.

An effective trade-off is to use the PC5 interface for messages that are safety critical and can benefit from the low-latency, reliable, peer-to-peer connection allowed by the PC5 interface. All additional data can be carried over the Uu interface to free up PC5 to improve safety.

This approach suggests that direct peer-to-peer messages would benefit from a very small and efficient signature that can be included as part of each individual message. The transfer of identity validation data such as public key certificates or channel coordination content can then be distributed over the Uu interface.

This concept can be further extended when the Uu interface is supported by a cloud hosted application that maintains real-time state data about vehicles in a specific region or "zone" of roadway. An example of such a system is the Mobile Edge Computing (MEC) concept that has been demonstrated by various cellular carriers. This application is able to track the location and state of all vehicles in a defined region. The MEC software can then route messages to individual vehicles based on their current and anticipated future state.

In various implementations, a system for securing a message between a vehicle station and second station includes: a vehicle station configured to be located in a vehicle; and a second station configured to be located at a second station location other than the vehicle. The vehicle station is configured to receive a message from the second station, the second station transmits the message and a signature to the vehicle station over a first channel, the second station transmits identity validation data related to the message to the vehicle station over a second channel, the identity validation data corresponding to the vehicle station, the first channel is on a first network and the second channel is on a second network, the first network has a latency lower than the latency of the second network, the message requires the identity validation data for (or the identity validation data is required to enable) a portion (at least) of the message to be processed by the vehicle station, the second network has a higher bandwidth than the first network, and the identity validation data includes a time interval for use of the identity validation data, the identity validation data and the signature being configured to be used by the vehicle station and/or the second station to determine a validity of the message for use by the vehicle station.

In some implementations, the identity validation data includes a security key and meta data.

In some implementations, the meta data includes a definition of a geographic zone in which the security key is valid.

In some implementations, the meta data includes a definition of a time interval defined to synchronize security key validity periods among multiple geographic zones.

In some implementations, the meta data defines a group of vehicle stations that are currently in the geographic zone, or which are expected to enter the geographic zone within a lifetime of the security key.

In some implementations, the first channel is a PC5 channel.

In some implementations, the second channel is a cellular carrier-based channel.

In some implementations, the second channel is a Uu channel.

In some implementations, the signature is a Message Authentication Code (MAC) and the security key is a group key In some implementations, the signature is a Message Authentication Code (MAC) and the security key comprises paired keys.

In some implementations, the signature is a Stateless Few-Time Signature (FTS).

In some embodiments, the first channel is a bi-directional channel and/or the second channel is a bi-directional channel.

In various implementations, a method for securing a message between a vehicle station and second station includes: generating a message and a signature; transmitting, from the second station, the message and the signature to the vehicle station over a first channel on a first network, the first network having a latency lower than the latency of a second network; generating identity validation data related to the message; and transmitting, from the second station, the identity validation data to the vehicle station over a second channel on the second network, the identity validation data corresponding to the vehicle station, the second network having a higher bandwidth than the first network. The identity validation data is required to enable at least a portion of the message to be processed by the vehicle station, and the identity validation data includes a time interval for use of the identity validation data, and the identity validation data and the signature are configured to be used by the vehicle station and/or the second station to determine a validity of the message for use by the vehicle station.

In some implementations, the identity validation data includes a security key and meta data.

In some implementations, the meta data includes a definition of a geographic zone in which the security key is valid.

In some implementations, the meta data includes a definition of a time interval defined to synchronize security key validity periods among multiple geographic zones.

In some implementations, the meta data defines a group of vehicle stations that are currently in the geographic zone, or which are expected to enter the geographic zone within a lifetime of the security key.

In some implementations, the first channel is a PC5 channel.

In some implementations, the second channel is a cellular carrier-based channel.

In some implementations, the second channel is a Uu channel.

In some implementations, the signature is a Message Authentication Code (MAC) and the security key is a group key In some implementations, the signature is a Message Authentication Code (MAC) and the security key comprises paired keys.

In some implementations, the signature is a Stateless Few-Time Signature (FTS).

In some embodiments, the first channel is a bi-directional channel and/or the second channel is a bi-directional channel.

In various implementations, a non-transitory computer-readable medium is for securing a message between a vehicle station and second station, the non-transitory computer-readable medium comprising a plurality of instructions that, in response to execution by a processor, cause the processor to perform operations including: generating a message and a signature; transmitting, from the second station, the message and the signature to the vehicle station over a first channel on a first network, the first network having a latency lower than the latency of a second network; generating identity validation data related to the message; and transmitting, from the second station, the identity validation data to the vehicle station over a second channel on the second network, the identity validation data corresponding to the vehicle station, the second network having a higher bandwidth than the first network. The identity validation data is required for at least a portion of the message to be processed by the vehicle station, and the identity validation data includes a time interval for use of the identity validation data, and the identity validation data and the signature are configured to be used by the vehicle station and the second station to determine a validity of the message for use by the vehicle station.

In some implementations, the identity validation data includes a security key and meta data.

In some implementations, the first channel is a PC5 channel.

In some implementations, the second channel is a cellular carrier-based channel.

In some implementations, the second channel is a Uu channel.

In some embodiments, the first channel is a bi-directional channel and/or the second channel is a bi-directional channel.

DESCRIPTION OF THE DRAWINGS

The accompanying drawings, which are incorporated into and constitute a part of this specification, illustrate embodiments of the invention and together with the description, serve to explain the principles of the invention.

DETAILED DESCRIPTION

Figure 1:
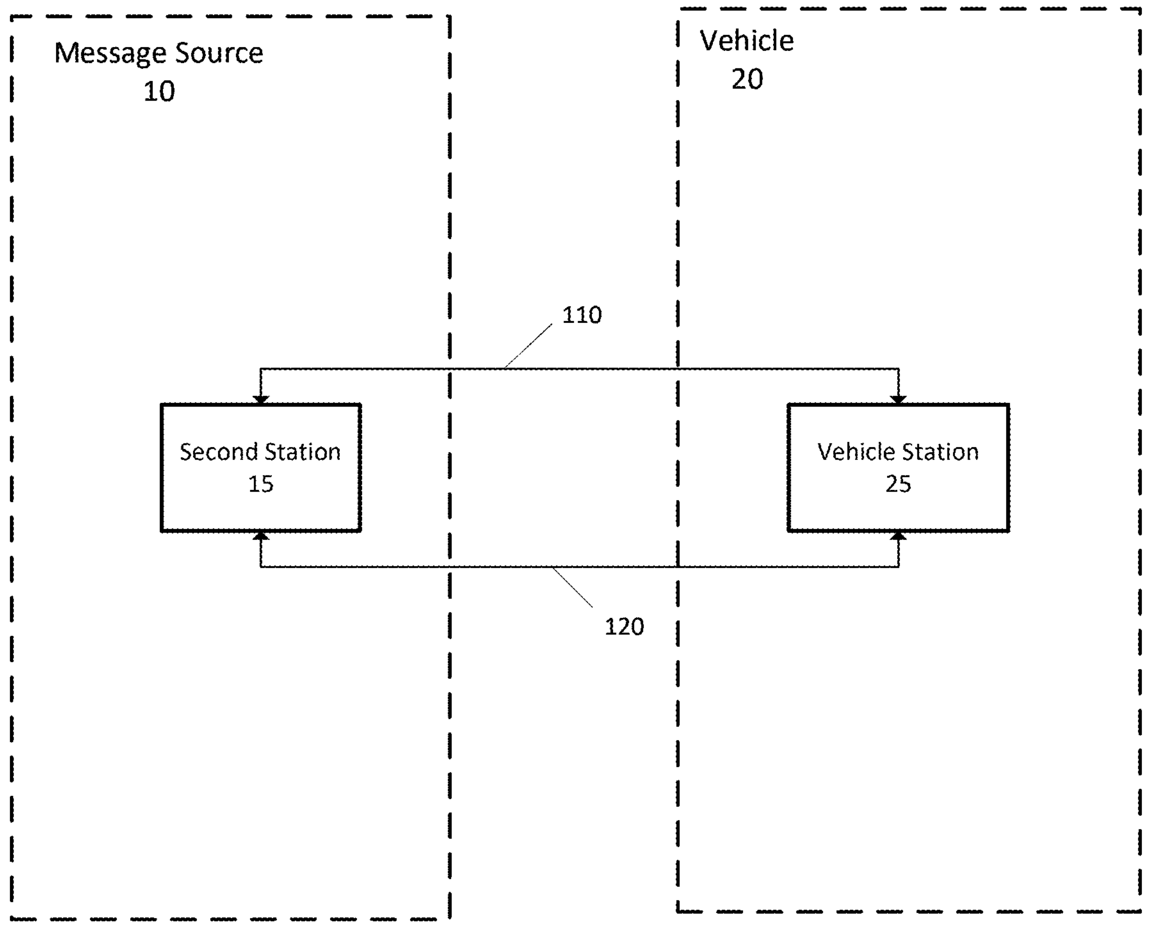
FIG. 1 is a block diagram showing an example of a system for securing a message between a vehicle station and second station, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

In order to ensure safe and proper operation in the field, embedded devices, for instance, the Electronic Control Unit (ECUs) used in vehicles, may need to be properly accessed remotely during use. Digital assets could include various cryptographic keys, a unique identifier, digital certificates, and software. It is therefore desirable to create systems and methods to securely communicate with these devices. As described above, this can me challenging in the age of quantum computing.

Some current V2X applications rely on Elliptic Curve Cryptography (ECC) which currently provides a high level of security with a signature that only requires about 100 bytes of data. The suite of message types defined in SAE J2735 Standard have been demonstrated to work within the constraints of the C-V2X PV5 interface when signatures of this size are used.

Exemplary embodiments include two exemplary methods for achieving post-quantum security with small signatures. The first method uses Message Authentication Codes (MACs) combined with either a group key or pairwise keys. The second method involves a special class of hash-based signatures (HBS) that are designed specifically for broadcast applications. It is noted that embodiments include bi-directional communication over one or more channels between two or more stations (for example, between one or more stationary stations and one or more mobile stations, or between two or more stationary stations, or between two or more mobile stations).

With Group Key

An example of the first method for achieving post-quantum security with small signatures uses MACs combined with a group key.

A MAC is a type of digital signature that requires both the sender and receiver to share a common key. This signature type can ensure message integrity but it can be weak in enforcing authenticity and non-repudiation. A benefit of this method is that signatures can be very small, typically just a few bytes are required.

In the case of a group key, a collection of devices or "stations", for example, will all share a common key. A message with a valid signature can be trusted to come from a member of the group with access to the key, but the receiver cannot be certain which group member created or modified the message.

In embodiments, in a hybrid messaging scheme, signed, safety-critical messages can be sent using the PC5, low latency network. The higher bandwidth Uu interface can be used to distribute a short-term group key along with meta data that describes the members of the group and a time interval for use of the key. In embodiments, a "zone" is defined to describe a physical intersection or section of roadway. In embodiments, a "time interval" is optionally defined to synchronize key validity periods among multiple zones which may be adjacent, overlapping, or isolated. In embodiments, membership of a group of stations (a "zone group") that will receive a "zone key" is defined as all stations (devices) that are currently in the zone, or which are expected to enter the zone within the lifetime of the key. In embodiments, a vehicle tracking application such as, for example, the MEC is used to track and predict the motion of each station. In embodiments, a sequence of "zone keys" are distributed to stations using the high-bandwidth Uu interface.

In embodiments, quantum resistant digital signatures (using a robust, stateless algorithm such as, for example, Sphinx, Crystals-Dilithim, or Falcon) are used to sign the zone keys and assorted meta data. Alternatively, the zone keys can be distributed over an authenticated channel such as a TLS session or secure publish/subscribe (pub/sub) method such as Message Queuing Telemetry Transport (MQTT). The session is stabilized using a robust, quantum-resistant algorithm.

In embodiments, each "zone key" has a short lifetime. The validity period of each key is communicated to the "zone group" as signed metadata which is distributed to all devices predicted to be in the zone. In embodiments, a station may be classified as belonging to two or more zones during a time interval. In embodiments, a short-term key is used to reflect the fact that vehicles (that, for example, include the station) will enter and leave the defined zone over time. A MEC-style application tracks vehicle and vulnerable road user motions, predicting which stations will enter and exit each of several define operating "zones". In embodiments, this group key, or "zone key" has a short life (for example, on the order of 30 seconds or less). In embodiments, the key is shared only with stations that are predicted to be in the corresponding zone. A station may be classified as belonging to two or more zones during one defined time interval. As each key nears its defined expiration, a new key is issued and shared with the stations that are predicted to be in the defined zone over the next time interval.

This method works, for example, as follows. A collection of stations are defined as belonging to a zone for a future time interval, noting that stations may belong to two or more adjacent, overlapping, or nearby zones. A zone key with metadata is then securely distributed to all stations in the defined zone for a future time interval.

In embodiments, the zone key is distributed over the high-bandwidth Uu channel. In embodiments, a zone key may be distributed to stations in the zone ahead of the start of the validity period of the key. This allows time for each station to receive the key, even if there is latency in the Uu channel. In embodiments, in cases where the MEC application can predict station movement into the future, zone keys may be distributed for future intervals. In embodiments, metadata may include the start and end validity period for the key (this may be implicit based on the time when the key is distributed). In embodiments, metadata may include information about the permissions of the stations in the zone. For example, the MEC may indicate that one or more station is a municipal vehicle (such as a fire truck or police car) with special permissions, or that some of the stations represent vulnerable road users such as, for example, pedestrians. In embodiments, the metadata is authenticated. This may be done, for example, using a signature applied to an individual message or as part of an authenticated stream (such as a Transport Layer Security (TLS) or other secure streaming protocol).

During the validity period of the zone key, stations that are members of the zone may exchange safety messages over the PC5 safety channel. In embodiments, each message is authenticated using, for example, a MAC. In embodiments, all stations use the same zone key to create and validate the MAC. In embodiments, each station may include a station ID in the broadcast data. Receiving stations may use this station ID, but they must be aware that any station in the group may impersonate any other station.

At the end of the validity period, all devices in the zone transition to use a new "zone key" for the next time interval. In embodiments, membership in the zone may change based on the predicted motion of each station from one time interval to the next. In embodiments, the MEC will inform all stations in the zone about new stations that have entered and stations that have left the zone over, for example, the high-bandwidth Uu interface.

In embodiments using a zone key, all stations in a defined zone receive the same key, and the key is valid for a short interval. Stations within a zone can maliciously impersonate other stations, which is undesirable. The authenticated distribution of a list of zone members can restrict the types of misbehavior that can be exercised in the zone during the validity period of the zone key. Specifically, for example, a malicious station can only claim the permissions associated with one of the authentic stations in the zone. The actual permissions associated with each station in the zone can be authenticated using secure messages sent over the Uu channel, but this information will have high-latency and large signatures, so it cannot be reliably used to deliver real-time, safety-critical information.

Under this model, each device may also share a unique key with the MEC application. When sending a broadcast message, each device may include a separate MEC-MAC that is generated using the unique key shared only with the sending device and the MEC. The MEC may monitor broadcast messages and authenticate some or all of the MEC-MACs sent by individual devices. For example, one or more Road Side Units (RSUs) in a defined zone may forward broadcast messages that they receive to the MEC for validation. This option allows the MEC to monitor broadcast messages and validate that all zone stations are broadcasting legitimate data. Under this model, if a zone station should try to impersonate another station in the zone, the malicious station will not have access to the unique key that the target station has with the MEC, so it cannot provide the correct MEC-MAC in the message. This allows the MEC to detect impersonation in the zone.

With Paired Keys

Another example of the first method for achieving post-quantum security with small signatures uses MACs combined with paired keys.

An alternative architecture is to use MAC security on broadcast messages using keys that are shared only between a pair of stations. Optionally, larger clusters (for example, 3 or more stations in a cluster) may be defined. Unlike the zone model, the stations that share a key in the paired keys model will, for example, retain the shared key for a longer period of time (for example, minutes) while the stations remain in the same region. The end of life of the shared key may be managed by the individual stations, or it may be managed by an application such as a MEC.

This method takes advantage of MAC codes typically being very short. It also benefits from the MACs being very efficient to generate and to validate. This means that multiple MAC codes may be attached to each broadcast message over the safety critical PC5 interface.

In this model, each station maintains a list of keys and station IDs. Each key is associated with one or more station IDs. Safety critical messages sent over the PC5 channel will contain a list of station IDs and MAC codes that provide evidence of the authenticity of the message.

In embodiments, when a station receives a message over the PC5 channel, it will compare the station ID of the sender with its list of secure keys. If a matching station ID and key is found, then the corresponding key will be used to validate the MAC. Messages that pass MAC validation will be trusted.

In embodiments, when a station broadcasts over the PC5 interface, it will attach a list of MAC codes and receiver station IDs. Each MAC code will be calculated using a different secure key, corresponding to a station known to the sender.

In embodiments, when broadcasting a message, the sender will decide which recipient keys to use, and which recipient IDs to include in the broadcast message based on context.

In embodiments, paired keys are distributed by a MEC application that tracks which stations are predicted to be in close proximity to each other in the "near" future (for example, over the span of 100 ms or more). In embodiments, each key, and the corresponding station IDs are distributed over a secure session (such as TLS or authenticated pub/sub protocol like MQTT) or sent as individually signed messages. In embodiments, a robust quantum-safe algorithm, for example, is used to secure this communication. Key distribution is performed over, for example, the high-bandwidth Uu channel.

Due to higher latency possibly delaying the delivery of paired keys, they are preferably distributed to stations ahead of the time when they are needed. A MEC may anticipate proximity of stations and proactively distribute keys before they are required to mitigate the impact of delays on the Uu interface.

In the case of paired keys, stations cannot impersonate other stations, so individual device permissions may be included in broadcast messages and trusted, provided that the sender's key is known to the recipient and the corresponding MAC is authenticated.

To reduce bandwidth used on the PC5 interface, an order may be assigned to the station IDs in a region. For example, a MEC application may define a zone (similar to the shared key method above), and publish an ordered list of stations in the zone. This will be done, for example, over the Uu channel using, for example, an authenticated message. Once this is done, broadcast messages can eliminate the station ID for each recipient in broadcast content. Instead, each broadcast message will contain, for example, a list of MAC codes where the intended recipient for each MAC is implied by the order of the MACs which correspond to the ordered list of stations that were broadcast by the MEC. This list may be periodically refreshed by the MEC as stations move and change proximity.

As with the zone based method, the MEC application may maintain a unique key for each station that it is currently managing. When sending a broadcast message, each station will include, for example, the MEC as a paired recipient on the message and use the unique station key to produce a MEC-MAC which would be added to the broadcast message. As with any other receiving station, the MEC station ID would either be explicitly identified in the body of the message or it may be implicitly identified in the order of MACs attached to the broadcast message. By monitoring broadcast messages (such as through a local RSU), the MEC can optionally validate some or all of the MEC-MACs to detect malicious actors.

Signed Messages With Individual Signatures

A class of algorithms have been proposed with small (on the order of 100 bytes) signatures that are believed to be quantum-safe. These algorithms are generally classified as "stateless few-time signature" or FTS schemes. Non-exclusive examples include: BiBa, Ball in Bin algorithm; HORS, Hash to Obtain Random Subsets; HORST, HORS variant with Trees; PORS, variant with PRNGs; FORS, variant with Forests; TESLA, Timed Efficient Stream Loss-tolerant Authentication; and FLAMeS, Fast, Loss-Tolerant Authentication of Multicast Streams.

Common properties of these algorithms, in general, are: (1) very small signature size (on the order of 100 to 250 bytes); (2) very efficient validation; (3) somewhat efficient signature generation; (4) large public keys (on the order of several KB); (5) security is reduced with each signature produced, limiting the useful lifespan of a private key to a defined number of signatures when a lower threshold of security is defined; (6) simplified stateful operation, meaning that the only "state" information that needs to be maintained by a signer is the number of signatures produced with a given key "a", where a signer has reliable access to the current time, the life of a key, and the maximum number of signatures that may be associated with the time during which the key is valid.

In the case of V2X stations, a reliable source of time may be obtained over the GPS receiver. Trust in GPS data is a requirement for basic V2X safety operation, regardless of which digital signature method is used. Techniques exist to improve trust in GPS data. For example, inference may be used to "validate" the consistency of GPS data in a number of ways. A station may enforce that GPS time must be monotonically increasing, for example, the roll-back of GPS time indicates that GPS signal is invalid. A station may compare GPS time against an internal, free-running Real-Time Clock (RTC) and ensure that the statistics (mean, standard deviation) of the RTC is consistent. A significant change in RTC performance when compared to GPS data over a "short" interval indicates that GPS data may be invalid. A station may use inertial movement estimation and compare the predicted movement against GPS data. A significant change in predicted position error statistics when compared to GPS data indicates that GPS data may be invalid. A trusted alternative source of time and position data, such as authenticated data sent over the Uu channel may be used in addition to local references to derive a highly reliable source of time that is independent of GPS.

These are some examples of methods that may be used to improve the level of trust in GPS time and location data received by a V2X station. Trust in the unsigned, unsecured GPS data stream is inherent in all V2X applications. Malicious manipulation of GPS signals in an environment where there is no alternative source of time and location can cause failure in a V2X deployment, regardless of the digital signature method used and independent of the threat posed by a quantum computer.

Under the assumption that a reliable source of time is available to all stations, a quantum-safe FTS algorithm may be applied for V2X messages. The small signature size and efficient sign/validate functions allow these algorithms to provide a convenient "drop-in" replacement for ECC signatures. The only difference is in the very large public key size and relatively short-life of each signing key. These limitations may be addressed using secure messages sent over the higher-bandwidth Uu interface.

Note that V2X schemes, including the currently used ECC-based signatures, rely on short-lived key pairs for signing peer-to-peer messages. In the case of the North American Secure Credential Management System (SCMS) architecture, vehicle signing keys typically have a life span of 1 week and are used in batches of 20 for intervals of 5 minutes. After 1 week, keys are replaced through a certificate "top-off" process. Stations in this model can exchange certificates, including their public key, through peer-to-peer distribution over the PC5 interface without significantly impacting the limited bandwidth channel.

In an environment where FTS algorithms are used in place of ECC, the distribution of public keys shall be done over, for example, the high-bandwidth Uu interface. Public keys can be delivered to all stations in a zone by a coordinating system, such as a MEC, in anticipation of when they are required (for example, before stations are within range of communicating over the PC5 interface) or they can be requested on-demand. Public keys may be distributed as signed certificates or as trusted data elements sent over a secured session (such as TLS or secured pub/sub protocol).

In this environment, stations can replace their batches of public keys very frequently. For example, using the long-range, high-bandwidth Uu interface, each station may request a "top-off" of new keys and certificates every 5 minutes. This could rely on distributed key generation, meaning that the station generates fresh key pairs and securely delivers the corresponding (large) public keys to the SCMS over a secure message on the Uu interface. Or, it can be centralized, where a regional SCMS service provides new private keys to a device through a secure session on the Uu interface.

Each station signs and broadcasts individual messages over the safety-critical PC5 interface just as they do using ECC today. The broadcast message body, including digital signature, may follow the same SAE standard message types as are used today. Stations can receive and validate the efficient FTS signatures on broadcast messages. Large public keys for in-range stations, for example, will be provided to all stations from, for example, a regional SCMS service, or requested on-demand over the higher-bandwidth Uu channel.

State may be maintained by tracking GPS time. Each private key may be used for a defined time interval. This, combined with the constrained compute resources of each station, assures that a limited number of signatures may be generated during a defined time interval. An attack that "resets" the signature count (i.e. resets the state management) in a station will be detected due to the continuous progression of GPS time along with a local RTC time reference.

Under this model, an attacker may be successful in simultaneously overriding GPS signals and resetting the internal reference in a station. In this case, a station may exceed the maximum number of signatures allowed for the private key, weakening the key's resistance to signature forgery by a sufficiently sophisticated attacker. However, such an attack would already have compromised most other V2X deployments. Even in cases where ECC is trusted today, an attacker that can "trick" a station to rely on fake GPS signals can effectively be manipulated to broadcast invalid signed data using the internal private key. The potential compromise of a short-lived FTS private key has very limited scope and represents little additional risk to the overall V2X ecosystem.

FIG. 1 shows an example of a system in accordance with embodiments of the disclosure. In this example, a second station 15 is located at a message source 10 such as, for example, a land-based, stationary facility. Non-exclusive examples of message source 10 include a building, a road side unit (RSU), or a vehicle. In this example, a vehicle station 25 is located in a vehicle 20. Non-exclusive examples of vehicle 20 include an automobile, a truck, a fire engine, an ambulance, a law enforcement vehicle, farm equipment, and any other mobile device. In this example, the vehicle station 25 and the second station 15 communicate over a first unidirectional or bi-directional channel/network 110 and a second unidirectional or bi-directional channel/network 120. As described above, in exemplary embodiments, the first channel/network 110 is a low-latency channel/network with potentially lower bandwidth, and the second channel/network 120 is a potentially higher-latency channel/network with higher bandwidth.

Figure 2:
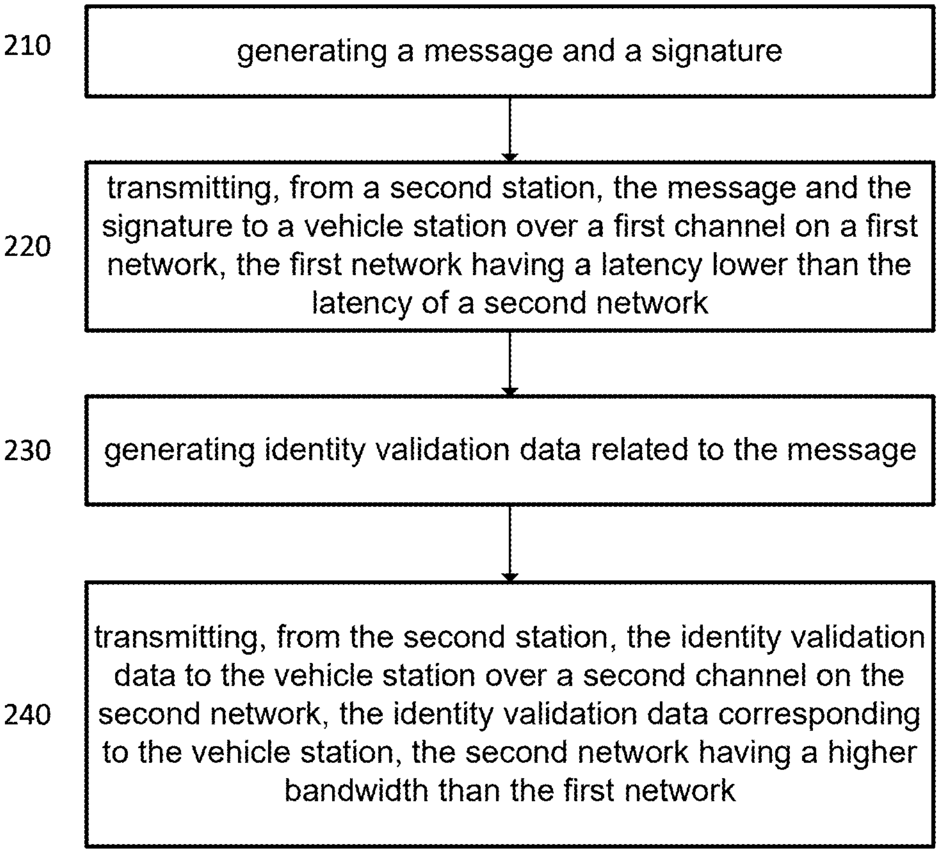
FIG. 2 is a flow chart showing an exemplary method consistent with embodiments of the invention.

FIG. 2 shows an example of a method in accordance with embodiments of the disclosure. In step 210, a message and a signature are generated. In step 220, the message and the signature are transmitted from a second station to a vehicle station over a first channel on a first network. In this example, the first network has a latency lower than the latency of a second network. In step 230, identity validation data related to the message is generated. In step 240, the identity validation data is transmitted from the second station to the vehicle station over a second channel on the second network. In this example, the identity validation data corresponds to the vehicle station, and the second network has a higher bandwidth than the first network.

In general, the various methods, operations, and functions described herein may be performed, at least partially, by one or more virtual machines (VMs). In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the processes, functions, and operations described herein may be at least partially processor-implemented, with a particular processor or processors being an example of hardware. For example, at least some of the operations of a function may be performed by one or more processors or processor-implemented modules. Moreover, the processor(s) may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within an office environment, a manufacturing environment, or a server farm). In other example embodiments, the processors or processor-implemented modules may be distributed across a number of geographic locations.

Other embodiments of the invention will be apparent to those skilled in the art from consideration of the specification and practice of the invention disclosed herein. It is intended that this specification be considered as disclosing examples only, with a true scope and spirit of the invention being indicated by the forthcoming claims of the corresponding non-provisional application.

What is claimed is:

1. A system for securing a message between a vehicle station and second station, comprising:

a vehicle station configured to be located in a vehicle; and a second station configured to be located at a second station location other than the vehicle, wherein the vehicle station is configured to receive a message from the second station, wherein the second station transmits the message and a signature to the vehicle station over a first channel, wherein the second station transmits identity validation data related to the message to the vehicle station over a second channel, the identity validation data corresponding to the vehicle station, wherein the first channel is on a first network and the second channel is on a second network, wherein the first network has a latency lower than the latency of the second network, wherein the message requires the identity validation data for a portion of the message to be processed by the vehicle station, wherein the second network has a higher bandwidth than the first network, wherein the identity validation data includes a security key and meta data, wherein the meta data includes a definition of a geographic zone in which the security key is valid, wherein the meta data includes a definition of a time interval defined to synchronize security key validity periods among multiple geographic zones, and wherein the identity validation data includes a time interval for use of the identity validation data, the identity validation data and the signature being configured to be used by the vehicle station and the second station to determine a validity of the message for use by the vehicle station.

2. The system of claim 1, wherein the first channel is a PC5 channel.

3. The system of claim 2, wherein the second channel is a cellular carrier-based channel.

4. The system of claim 3, wherein the second channel is a Uu channel.

5. The system of claim 1, wherein the signature is a Message Authentication Code (MAC) and the security key is a group key.

6. The system of claim 1, wherein the signature is a Message Authentication Code (MAC) and the security key comprises paired keys.

7. The system of claim 1, wherein the signature is a Stateless Few-Time Signature (FTS).

8. The system of claim 1, wherein the first channel is a bi-directional channel and/or the second channel is a bi-directional channel.

9. A method for securing a message between a vehicle station and a second station, the method comprising:

generating a message and a signature;

transmitting, from the second station, the message and the signature to the vehicle station over a first channel on a first network, the first network having a latency lower than the latency of a second network;

generating identity validation data related to the message; and transmitting, from the second station, the identity validation data to the vehicle station over a second channel on the second network, the identity validation data corresponding to the vehicle station, the second network having a higher bandwidth than the first network, wherein the identity validation data is required to enable at least a portion of the message to be processed by the vehicle station, wherein the identity validation data includes a security key and meta data, wherein the meta data includes a definition of a geographic zone in which the security key is valid, wherein the meta data includes a definition of a time interval defined to synchronize security key validity periods among multiple geographic zones, and wherein the identity validation data includes a time interval for use of the identity validation data, and the identity validation data and the signature are configured to be used by the vehicle station and/or the second station to determine a validity of the message for use by the vehicle station.

10. The method of claim 9, wherein the first channel is a PC5 channel.

11. The method of claim 10, wherein the second channel is a cellular carrier-based channel.

12. The method of claim 11, wherein the second channel is a Uu channel.

13. The method of claim 9, wherein the signature is a Message Authentication Code (MAC) and the security key is a group key.

14. The method of claim 9, wherein the signature is a Message Authentication Code (MAC) and the security key comprises paired keys.

15. The method of claim 9, wherein the signature is a Stateless Few-Time Signature (FTS).

16. The method of claim 9, wherein the first channel is a bi-directional channel and/or the second channel is a bi-directional channel.

17. A non-transitory computer-readable medium for securing a message between a vehicle station and second station, the non-transitory computer-readable medium comprising a plurality of instructions that, in response to execution by a processor, cause the processor to perform operations comprising:

generating a message and a signature;

transmitting, from the second station, the message and the signature to the vehicle station over a first channel on a first network, the first network having a latency lower than the latency of a second network;

generating identity validation data related to the message; and transmitting, from the second station, the identity validation data to the vehicle station over a second channel on the second network, the identity validation data corresponding to the vehicle station, the second network having a higher bandwidth than the first network, wherein the identity validation data is required for at least a portion of the message to be processed by the vehicle station, wherein the identity validation data includes a security key and meta data, wherein the meta data includes a definition of a geographic zone in which the security key is valid, wherein the meta data includes a definition of a time interval defined to synchronize security key validity periods among multiple geographic zones, and wherein the identity validation data includes a time interval for use of the identity validation data, and the identity validation data and the signature are configured to be used by the vehicle station and/or the second station to determine a validity of the message for use by the vehicle station.

18. The non-transitory computer-readable medium of claim 17, wherein the identity validation data includes a security key and meta data.

19. The non-transitory computer-readable medium of claim 17, wherein the first channel is a PC5 channel.

20. The non-transitory computer-readable medium of claim 19, wherein the second channel is a cellular carrier-based channel.

21. The non-transitory computer-readable medium of claim 20, wherein the second channel is a Uu channel.

22. The non-transitory computer-readable medium of claim 17, wherein the first channel is a bi-directional channel and/or the second channel is a bi-directional channel.

23. A system for securing a message between a vehicle station and second station, comprising:

a vehicle station configured to be located in a vehicle; and a second station configured to be located at a second station location other than the vehicle, wherein the vehicle station is configured to receive a message from the second station, wherein the second station transmits the message and a signature to the vehicle station over a first channel, wherein the second station transmits identity validation data related to the message to the vehicle station over a second channel, the identity validation data corresponding to the vehicle station, wherein the first channel is on a first network and the second channel is on a second network, wherein the first network has a latency lower than the latency of the second network, wherein the message requires the identity validation data for a portion of the message to be processed by the vehicle station, wherein the second network has a higher bandwidth than the first network, wherein the identity validation data includes a security key and meta data, wherein the meta data includes a definition of a geographic zone in which the security key is valid, wherein the meta data defines a group of vehicle stations that are currently in the geographic zone, or which are expected to enter the geographic zone within a lifetime of the security key, and wherein the identity validation data includes a time interval for use of the identity validation data, the identity validation data and the signature being configured to be used by the vehicle station and the second station to determine a validity of the message for use by the vehicle station.

24. The system of claim 23, wherein the second channel is a cellular carrier-based channel.

25. The system of claim 23, wherein the signature is a Stateless Few-Time Signature (FTS).

26. The system of claim 23, wherein the first channel is a bi-directional channel and/or the second channel is a bi-directional channel.

27. A method for securing a message between a vehicle station and a second station, the method comprising:

generating a message and a signature;

transmitting, from the second station, the message and the signature to the vehicle station over a first channel on a first network, the first network having a latency lower than the latency of a second network;

generating identity validation data related to the message; and transmitting, from the second station, the identity validation data to the vehicle station over a second channel on the second network, the identity validation data corresponding to the vehicle station, the second network having a higher bandwidth than the first network, wherein the identity validation data is required to enable at least a portion of the message to be processed by the vehicle station, wherein the identity validation data includes a security key and meta data, wherein the meta data includes a definition of a geographic zone in which the security key is valid, wherein the meta data defines a group of vehicle stations that are currently in the geographic zone, or which are expected to enter the geographic zone within a lifetime of the security key, and wherein the identity validation data includes a time interval for use of the identity validation data, and the identity validation data and the signature are configured to be used by the vehicle station and/or the second station to determine a validity of the message for use by the vehicle station.

28. The method of claim 27, wherein the signature is a Stateless Few-Time Signature (FTS).

29. A non-transitory computer-readable medium for securing a message between a vehicle station and second station, the non-transitory computer-readable medium comprising a plurality of instructions that, in response to execution by a processor, cause the processor to perform operations comprising:

generating a message and a signature;

transmitting, from the second station, the message and the signature to the vehicle station over a first channel on a first network, the first network having a latency lower than the latency of a second network;

generating identity validation data related to the message; and transmitting, from the second station, the identity validation data to the vehicle station over a second channel on the second network, the identity validation data corresponding to the vehicle station, the second network having a higher bandwidth than the first network, wherein the identity validation data is required for at least a portion of the message to be processed by the vehicle station, wherein the identity validation data includes a security key and meta data, wherein the meta data includes a definition of a geographic zone in which the security key is valid, wherein the meta data defines a group of vehicle stations that are currently in the geographic zone, or which are expected to enter the geographic zone within a lifetime of the security key, and wherein the identity validation data includes a time interval for use of the identity validation data, and the identity validation data and the signature are configured to be used by the vehicle station and/or the second station to determine a validity of the message for use by the vehicle station.

30. The non-transitory computer-readable medium of claim 29, wherein the signature is a Stateless Few-Time Signature (FTS).

* * * * *